Feb. 27, 1968  J. D. MARSDEN  3,370,693
CONVEYOR ARRANGEMENTS
Filed July 19, 1966  2 Sheets-Sheet 1

INVENTOR
John Dennis Marsden
BY Kindelman, Kindelman & Ottinger
ATTORNEYS 3,370,693
CONVEYOR ARRANGEMENTS
John Dennis Marsden, Crayford Erith, Kent, England, assignor to The General Electric Company, Limited, London, England, a British company
Filed July 19, 1966, Ser. No. 566,425
Claims priority, application Great Britain, July 23, 1965, 31,650/65
8 Claims. (Cl. 198—34)

ABSTRACT OF THE DISCLOSURE

A conveyor arrangement for accumulating articles, especially easily deformable articles such as unfired bricks, utilizing two conveyor belts having adjacent ends supported by pulleys on a movable carriage, the articles being fed continuously by the first belt towards the stationary second belt, and the carriage being movable to cause the second belt to unroll under each article in turn as the articles reach the junction of the belts until a predetermined number of articles have been accumulated on the second belt. The second belt can then be operated to transfer the articles to further conveying means.

---

Figure 1:
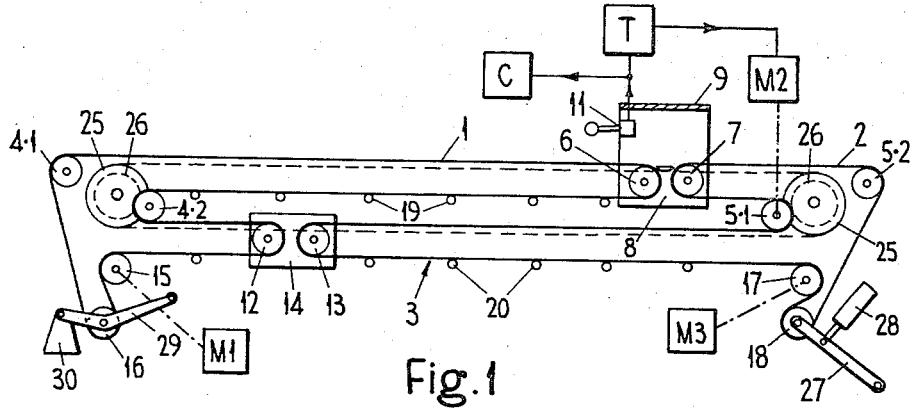

This invention relates to conveyor arrangements and has particular application to arrangements for accumulating articles for subsequent despatch in batches. Such accumulation is normally achieved merely by providing a stop in the path of articles being fed along a conveyor, such that, for example, when a first article reaches said stop it is held by the latter against the feed of the conveyor and subsequent articles pile up against each preceding article until the required number of articles are accumulated. However, an arrangement as above described is entirely unsuitable in cases where the articles to be accumulated are fragile or easily deformed, since the articles may easily be damaged due to their contacting each other as they pile up against the stop.

It is an object of this invention to provide a conveyor arrangement which is suitable for accumulating such articles.

According to the present invention, there is provided a conveyor arrangement for accumulating articles comprising first and second endless conveyor belts disposed in alignment and with adjacent ends in close proximity and supported by pulleys which are capable of movement together in the length direction of the conveyor arrangement, driving means for the first belt to cause articles carried by the belt to be fed by said belt continuously towards the junction of the belts whilst the second belt is held stationary, sensing means supported at or near the junction of the belts so as to be actuated by each article as the latter approaches said junction, and second drive means designed to be operated in response to the actuation of the sensing means by a said article to cause said pulleys and the sensing means to move together in the opposite direction to the direction of feed of the articles and thereby cause the adjacent end of the second belt effectively to be unrolled under the article so as to effect the transfer of the article from the first to the second belt.

It can be seen that by regulating the period of operation of the second drive means the spacing between successive articles accumulating on the second conveyor can be controlled. Moreover by this arrangement the part of the belt on which articles have been deposited is held stationary during the transfer of successive articles and thus assists in preventing damage of the articles whilst they are being accumulated.

Where the articles to be accumulated are of the same shape and dimensions as will usually be the case, the period of operation of the second drive means may be terminated after a selected time interval following its initiation to control the spacing of the articles on the second belt. Alternatively further sensing means may be associated with the second conveyor for terminating the operation of the second drive means when an article transferred is at a selected spacing from the junction of the conveyor belts. Such an arrangement can also be employed where the articles to be accumulated are of different sizes.

Means are preferably provided for automatically effecting a transfer of the articles from the second belt to further conveying means when a predetermined number of the articles have been accumulated on the belt, and this may be achieved by driving the second belt automatically in the appropriate direction when the selected number of the articles have been fed on to it. Alternatively means may be provided for effecting a transfer of articles from the second conveyor in response to the receipt of an external control signal. In some cases means may also be provided for terminating the transfer when a required number of articles, which may be less than the full number carried by the second belt, has been transferred, for example when the further conveying means to which the articles are transferred has a required quota of articles.

Reversal of the second drive means which can be arranged to take place during or following the transfer of the batch of articles returns the adjacent ends of the belts to their original position in readiness for the accumulation of a further batch.

It will be appreciated that the reference to endless belts includes any suitable endless conveying web capable of carrying the articles; the pulleys supporting the belts being also of any suitable form.

It will be further appreciated that suitable means, for example, means for providing a compensating movement of the pulleys supporting the opposite ends of the belts, must be provided to permit the movement of the pulleys supporting the said adjacent ends of the belts to take place on the energisation of the second drive means.

Conveniently, the two conveyor belts may be coupled together at both their ends through pulleys to form in effect an endless conveyor arrangement which is wound around spaced main pulleys, the pulleys coupling the said adjacent ends and the said opposite ends of the belts moving together in corresponding opposite directions when the second drive means is energised, and the arrangement so formed providing a compact structure.

The sensing means can be of any convenient kind which can be actuated by the articles; for example it may take the form of electric switching means designed to be operated mechanically by the passage of the articles or a photoresponsive device operable by interruption of a light beam directed on to the device across the path of the articles.

The invention is particularly applicable to the accumulation of bricks during the manufacture thereof, for example prior to firing when they are in a soft state and readily damaged by contact with one another.

Figure 2:
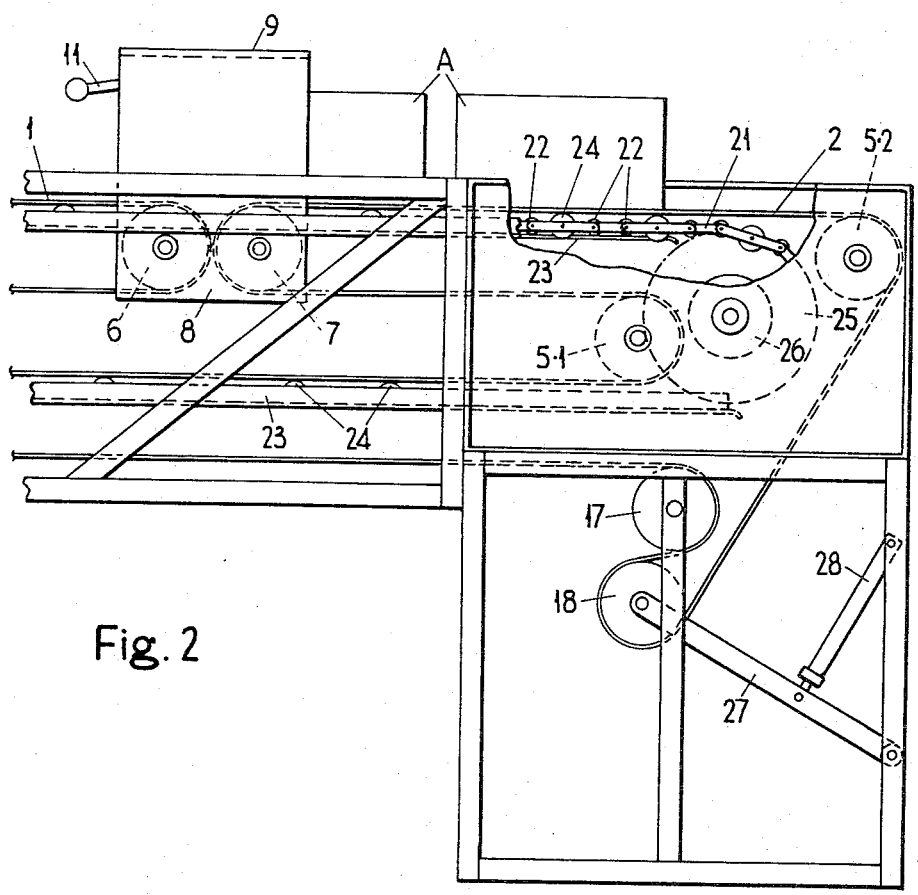
Figure 3:
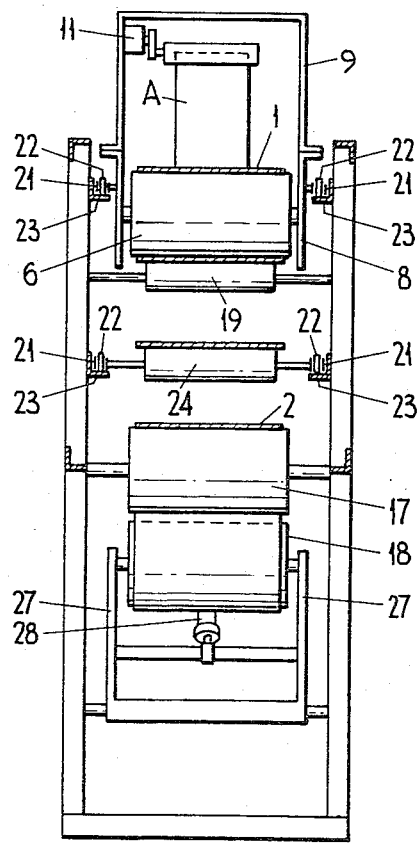

In order that the invention may be readily understood an accumulating conveyor arrangement constructed in accordance with the invention and suitable for such a purpose will now be described by way of example, with reference to the accompanying drawings in which:

FIGURE 1 is a simplified diagrammatic side view of the conveyor arrangement, and FIGURES 2 and 3 represent an enlarged fragmentary side view of one end of said conveyor arrangement and a transverse section of the arrangement respectively.

Referring to FIGURE 1 of the drawings, the conveyor arrangement comprises essentially a first and second elongated endless belt referenced 1 and 2, respectively which belts are coupled together at their ends as will subsequently be described to form an endless conveyor arrangement generally denoted 3, the belts 1, 2 of the arrangement being wound around spaced main support pulleys 4·1, 4·2, and 5·1, 5·2 respectively as shown. The connected ends of the belts 1 and 2 are arranged such that one pair of connected ends are positioned in the upper run of the conveyor arrangement 3, and the other pair of connected ends in the lower run of said arrangement. The ends of the belts 1 and 2 in the upper run of the conveyor arrangement 3 are defined by pulleys 6 and 7 and these pulleys are each rotatably mounted on a carriage 8 which extends across the junction between said ends and provides the coupling for the latter. The carriage 8 also carries a bridge 9 (see particularly FIGURE 3), which extends in a plane parallel to the axes of the pulleys, the bridge carrying a sensing switch 11 for a purpose to be described in detail hereinafter. The ends of the belts 1 and 2 in the lower run of the arrangement 3 are defined by pulleys 12 and 13 which are mounted on a further carriage 14, each pulley being rotatably mounted between side walls of the carriage 14. Further intermediate pulleys 15, 16 and 17, 18, are provided for the belts 1 and 2 respectively and engage the outer runs of their respective belts at the positions shown in FIGURE 1 of the drawings. Support pulleys 19 and 20 are also provided at suitable positions along the conveyor arrangement 3 as shown in FIGURE 1 of the drawings.

Referring now to FIGURES 2 and 3 of the drawings, the endless belts 1 and 2 of the conveyor arrangement 3 are further supported by a pair of endless roller chains 21, the rollers 22 of each of which run on a guide track 23 provided one on each side of the conveyor arrangement 3. The tracks 23 are so disposed as to provide guides for a plurality of further support pulleys 24, which extend between the two chains 21 and are rotatably mounted at spaced intervals thereon, these further pulleys providing a support along the length of the under surfaces of the outer runs of the belts 1 and 2, in the case of the upper run of the conveyor arrangement 3, and along the length of the under surfaces of the inner runs of the belts 1 and 2 in the case of the lower run of the said conveyor arrangement. The roller chains are attached to the carriages 8 and 14 by means of studs 39' fixed between appropriate links of the chains and the carriages and are supported at opposite ends of the conveyor arrangement by sprocket wheels 25 carried by rotatable drums 26.

In operation of the conveyor arrangement, the pulley 17 is braked to maintain the outer run of the belt 2 stationary and the pulley 15 is driven by a motor, shown diagrammatically at M1 constituting said first drive means to cause the belt 1 to feed the articles to be accumulated continuously towards the carriage 8, the feed for the conveyor arrangement shown in FIGURE 1 of the drawings being from left to right. As each article A (FIGURE 2) reaches the position of the carriage 8, it actuates the sensing switch 11 carried by the bridge 9 which switch initiates a further motor M2 constituting said second drive means to drive the main support pulley 5·1 in an anti-clockwise direction. Because the outer run of the belt 2 is held stationary, the drive from this main support pulley acts to "unroll" the end of the belt 2 defined by the pulley 7 under the article which actuated the switch 11, and thus the whole assembly comprising the carriage 8, pulleys 6 and 7 and bridge 9 moves bodily from right to left and hence the said articles which actuated the switch 11 passes under the bridge and transfers to the belt 2 across the junction between the two belts. The carriage 14 also moves correspondingly in the opposite direction, the drums 26 which support the roller chains 21 being, of course, freely rotatable during this operation to permit the required movement of the carriages to take place. The period of operation of the second drive means M2 during each transfer process is so chosen that the articles accumulating on the belt 2 have spaces left therebetween, and thus the arrangement is very suitable for accumulating fragile articles, means being provided for adjusting this period to enable the spacing to be controlled. For example an electronic timing device of any suitable known kind shown diagrammatically at T and designed to be operated in response to the switch 11 is conveniently employed for controlling the period of operation of the second drive means M2 to achieve a desired spacing. When the desired number of articles have been accumulated on the belt 2, the accumulated articles can then be discharged from the right hand end of the conveyor arrangement 3 in a batch. This operation may be initiated automatically, for example by employing a timing or counting mechanism and may be carried out in various ways. Thus, for example in one arrangement the drive M1 to the pulley 15 is stopped when a counting mechanism, which could be associated with the switch 11, and which is shown diagrammatically at C, indicates that a required number of articles have been transferred to the conveyor belt 2, the pulley 15 then being braked, and the pulley 17 released, and driven by an associated motor M3 in an anti-clockwise direction. In an alternative arrangement a ratchet or holdback arrangement is provided on the pulley 7 to prevent rotation in an anti-clockwise direction, and after the drive to the pulley 15 has been stopped, a motor coupled to the drum 26 is initiated to drive the drum in a clockwise direction and thus feed the upper run of the conveyor arrangement 3 as a complete assembly from left to right. This latter arrangement provides the additional advantage of enabling the assembly of the carriage 8, pulleys 6 and 7 and bridge 9 to be moved back to a position in which it would be ready for a further article accumulating operation, without the need for stopping the drive to the pulley 15 should this be desired.

Switching means of any suitable known kind responsive to the position of the carriage 8 can be employed for automatically stopping the drive to the pulley 5·1 or drum 26 as the case may be when the carriage reaches its original position.

In order to ensure that the conveyor belts 1 and 2 are kept taut throughout the whole cycle of operation the pulley 18 is mounted on pivoted arms 27, and fluid to a hydraulic cylinder 28, whose piston acts on the arms in a downward direction, is maintained at a pressure to give the required degree of tautness of the belts. In addition the pulley 16 at the opposite end of the conveyor arrangement is supported by pivoted arms 29 biassed downwards by a weight 30.

I claim:

1. A conveyor arrangement for accumulating articles comprising first and second endless conveyor belts disposed in alignment and with adjacent ends in close proximity and supported by pulleys which are capable of movement together in the length direction of the conveyor arrangement, driving means for the first belt to cause articles carried by the belt to be fed by said belt continuously towards the junction of the belts whilst the second belt is held stationary, sensing means supported at or near the junction of the belts so as to be actuated by each article as the latter approaches said junction, and second drive means designed to be operated in response to the actuation of the sensing means by a said article to cause said pulleys and the sensing means to move together in the opposite direction to the direction of feed of the articles and thereby cause the adjacent end of the second belt effectively to be unrolled under the article so as to effect the transfer of the article from the first to the second belt.

2. A conveyor according to claim 1 incorporating means for regulating the period of operation of the second drive means so as to control the spacing between successive articles accumulating on the second conveyor.

3. A conveyor according to claim 2 including means for terminating the period of operation of the second drive means after a selected time interval following its initiation.

4. A conveyor arrangement according to claim 1 including means for driving the second conveyor belt automatically in the same direction as the first belt when a selected number of articles have been fed on to it for effecting a transfer of the articles from the second belt to further conveying means.

5. A conveyor arrangement according to claim 4 including means for reversing the movement of the second drive means to return the adjacent ends of the belts to their original position during or immediately following said transfer of a batch of articles from the second conveyor belt.

6. A conveyor arrangement according to claim 1 wherein the two conveyor belts are coupled together at both their ends through pulleys to form in effect an endless conveyor which is wound around spaced main pulleys, the end pulleys coupling the said adjacent ends and the said opposite ends of the belts being arranged to move together in corresponding opposite directions when the second drive means is energised.

7. A conveyor according to claim 1 wherein the sensing is in the form of electric switching means designed to be operated mechanically by the passage of the articles.

8. A conveyor according to claim 1 wherein the sensing means includes a photoresponsive device and means for directing a light beam thereon across the path of said articles and arranged to be operated by the interruption of the light beam by said articles.

References Cited

UNITED STATES PATENTS 1,703,881    3/1929    Greer _____ 198—34

EDWARD A. SROKA, *Primary Examiner.*